United States Patent

[11] 3,608,695

| | | |
|---|---|---|
| [72] | Inventor | Nils Erik Hellstrom<br>Nyland, Sweden |
| [21] | Appl. No. | 828,933 |
| [22] | Filed | May 29, 1969 |
| [45] | Patented | Sept. 28, 1971 |
| [73] | Assignee | Aktiebolaget Hammars Mekaniska<br>Verkstad<br>Nyland, Sweden |
| [32] | Priority | Dec. 18, 1968, Feb. 26, 1969 |
| [33] | | Sweden |
| [31] | | 17319/68 and 2586/69 |

[54] FEED RATE EQUALIZER MEANS
1 Claim, 3 Drawing Figs.

[52] U.S. Cl. ..................................................... 198/26,
198/34
[51] Int. Cl. ...................................................... B65g 47/26
[50] Field of Search............................................ 198/26, 34;
83/417; 144/245

[56] References Cited
UNITED STATES PATENTS

| | | | |
|---|---|---|---|
| 2,679,919 | 6/1954 | Koning.......................... | 198/34 |
| 3,095,960 | 7/1963 | Luginbuhl..................... | 198/37 X |
| 3,366,222 | 1/1968 | Rowekamp.................... | 198/34 |

*Primary Examiner*—Edward A. Sroka
*Attorney*—Holman & Stern

ABSTRACT: A conveyor assemblage for boards or pieces of lumber for obtaining a uniform flow rate of such items in which means are provided for arresting the boards arriving from a frame saw or the like, and for permitting the boards to arrive at a predetermined position with respect to the lugs of the high-speed conveyor, means are provided for releasing one board at a time, at predetermined time intervals, from the arrested position, accelerating the boards toward the high-speed conveyor and delivering the boards onto the conveyor between the lugs.

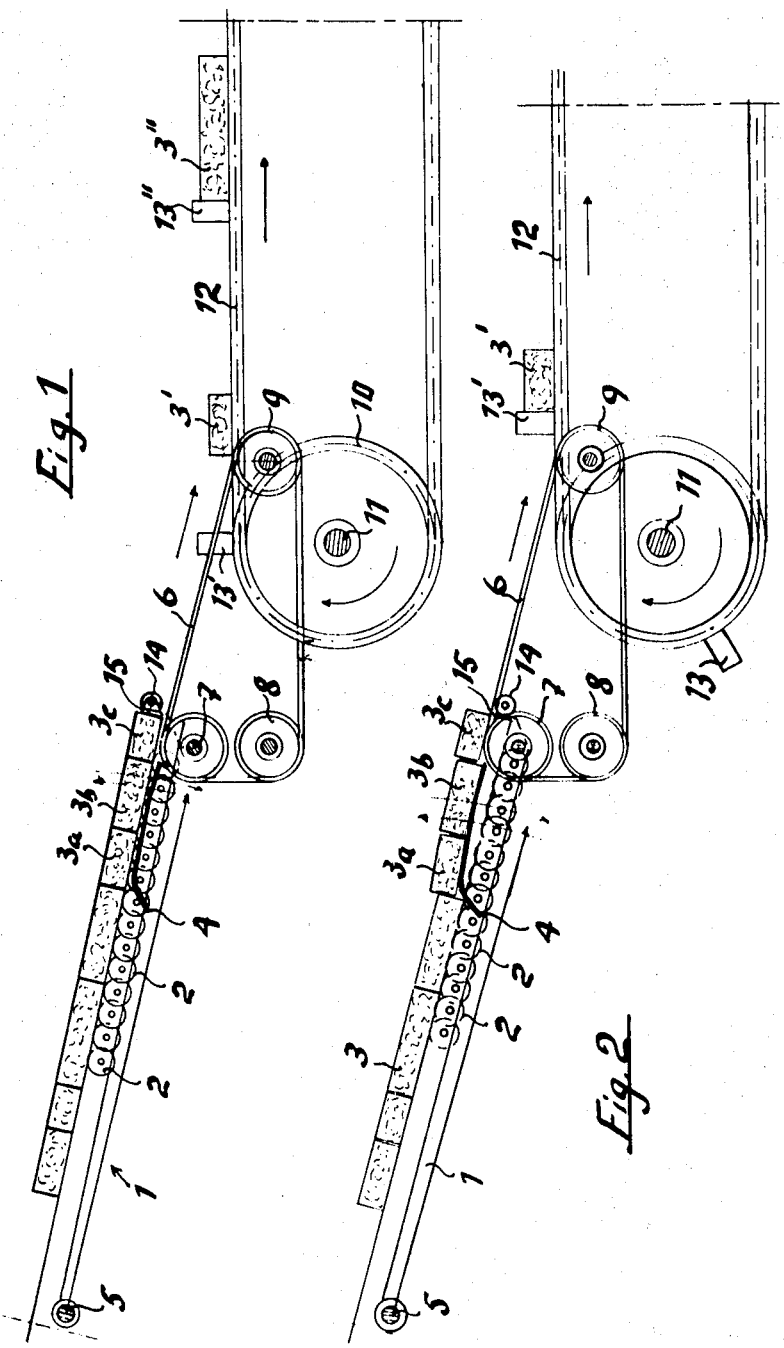

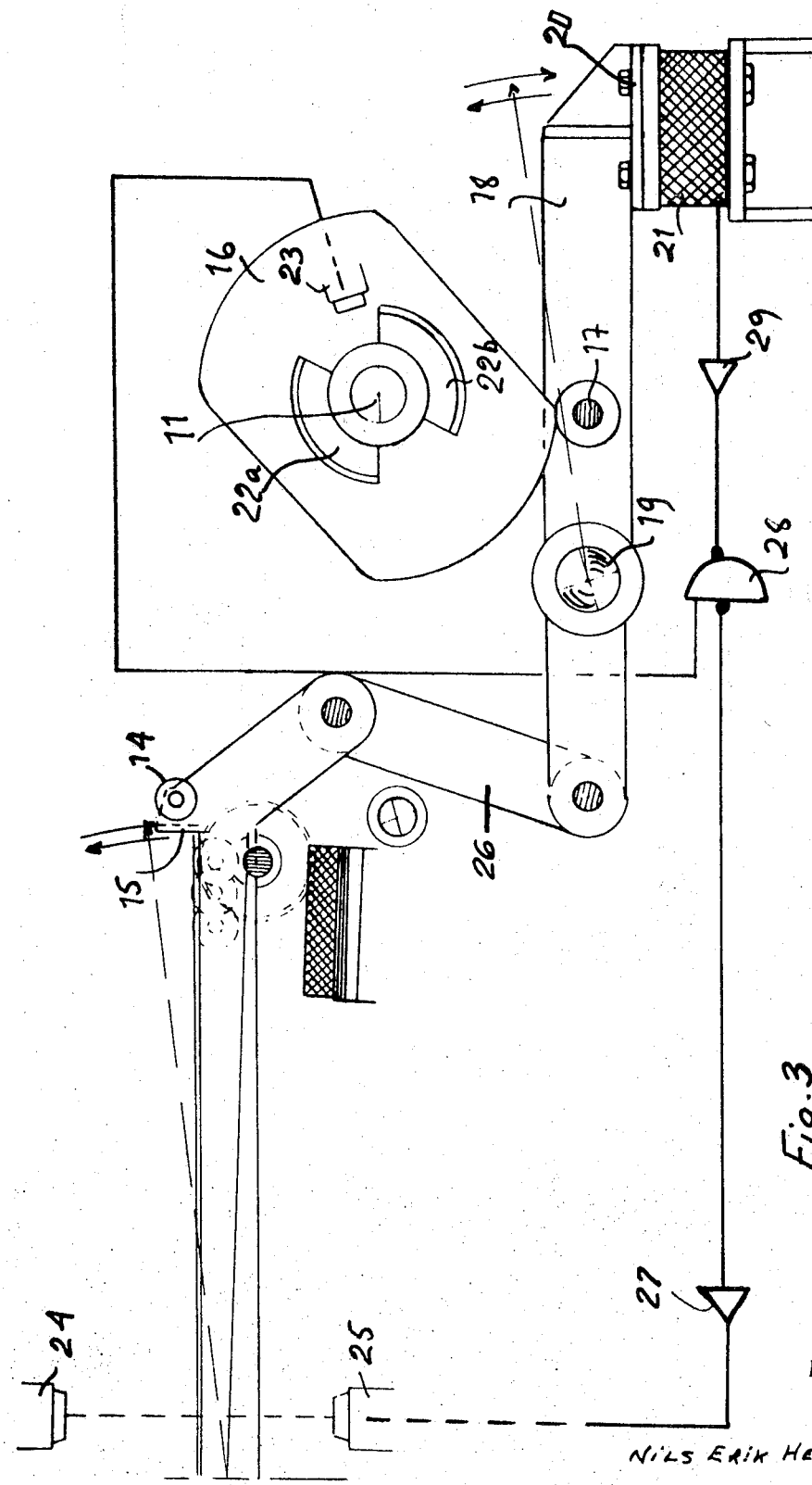

FEED RATE EQUALIZER MEANS

BACKGROUND OF THE INVENTION invention relates to a conveyor arrangement for wooden boards and similar elongated wooden articles, and more particularly to means for securing a uniform flow rate of such articles in a conveyor arrangement.

For a considerable period of time, it has been the commonly followed practice in sawmills and similar lumber processing plants to employ cross conveyors for transporting sawn boards or the like between different locations of the plant. These conveyors generally comprise a pair of endless chains arranged in parallel relationship, driving means for the chains and a plurality of lugs equally distributed along the length of each chain. In addition, various means have been proposed for supplying the boards to the conveyor at the receiving end thereof.

As modern sawmills become more and more automated and the saw speeds of frame saws substantially increased, attempts have been made to adapt the conventional conveyor loading means to the required higher speeds. Although such attempts have, in part, been successful, the conventional designs at best are power consuming, complex and unreliable at high speeds. Attempts have been made therefore to substitute some new and better design for the conventional apparatus for loading the boards onto a conveyor.

To my knowledge, the problem of providing a simple and reliable means for allowing boards which arrive at random at the receiving end of a conveyor to be loaded onto the conveyor in an orderly fashion and at high speeds has heretofore been unsolved.

SUMMARY OF THE INVENTION

According to the present invention, the boards which arrive from a frame saw or the like in a random manner, for example, in groups of boards emanating from one and the same lumber piece, the boards are initially arrested on an inclined plane such as a roller table. The boards which are already present on the table thus function in the nature of shock-absorbing means for the later arriving boards thus protecting the arresting mechanism. After the boards have been arrested, the boards are released one at a time at time intervals determined by the presence of a lug on a high-speed conveyor in a predetermined position. The boards thus released are transported by an intermediate conveyor, the speed of which bears definite relationship to the speed of the high-speed conveyor, the length of the intermediate conveyor and the distance between two adjacent lugs on the high-speed conveyor is also taken into account. From the intermediate conveyor, the boards are delivered onto the high-speed conveyor into the spaces or gaps existing between two adjacent lugs.

The main advantage of the present invention is that substantially no dynamic forces act on the arresting and releasing means which are operated once for each board thereby making it possible to realize a high-speed operation without excessive wear or power consumption in view of the fact that the arresting and releasing means, due to the small load, may have a rather small inertial mass.

Accordingly, a primary object of the invention is to provide a feed-rate-equalizer means for a conveyor assemblage for boards or pieces of lumber such that the boards arriving at the input end of the conveyor assembly in a random fashion may be delivered at the output end thereof in an orderly sequence having a fixed, predetermined rate.

A further object of the present invention is to provide positive synchronizing means between the feed-rate-equalizer means and the high-speed conveyor.

Yet a further object of the invention is to provide interlocking means between the input end of the conveyor assemblage and the arresting and releasing means such that a predetermined number of boards will always be present at the input end for absorbing the shock impulses from later arriving boards thus protecting the arresting and releasing means from such shocks.

Further objects and advantages of the present invention will become more readily apparent to persons skilled in the art from the following detailed description and annexed drawings, in which drawings:

BRIEF DESCRIPTION OF THE FIGURES

FIG. 1 is a side view partly in elevation and partly in cross section of the conveyor assemblage embodying the present invention at the instant at which a board is about to be released by the releasing and arresting means, FIG. 2 is a view generally similar to FIG. 1 at the instant at which a board has just been released for travel along the intermediate conveyor, and FIG. 3 is a fragmentary side view partly in elevation and partly in cross section on a larger scale that the FIGS. 1 and 2 of a synchronizing device according to the invention.

DETAILED DESCRIPTION OF THE INVENTION

As illustrated in FIGS. 1 and 2 the invention includes an inclined conveyor means 1, an intermediate conveyor means 6 and a high-speed conveyor means 12. The inclined conveyor means 1 is provided with a plurality of rollers 2 at the lower end thereof and on which boards of the same or varying widths arrive in parallel relationship to one another. The conveyor means 1, in effect, constitutes a roller table at its lower end. Boards, such as, 3a, 3b, and 3c will be arrested in edge-to-edge relationship on the conveyor means 1 in a manner to be later described. The conveyor means 1 is journaled on a shaft 5 located at a distance from the lower end thereof and can be raised and lowered as will be readily appreciated from a comparison between the positions illustrated in FIGS. 1 and 2. The lower end of the conveyor means 1 extends a certain small distance over the intermediate conveyor means 6.

In FIG. 1, the conveyor means 1 is illustrated in a position at which the boards rest edgewise against one another on the rollers 2 with a small distance or space between the lower surfaces of the boards 3a and 3b and the upper surface of a stationary frictional brake component 4. As indicated by the intersecting peripheries of the rollers 2, the rollers are arranged in a conventional fashion in two or more longitudinal rows and the frictional brake components extend between the rows.

The leading edge of the board 3c which is the next board to be transferred to the high-speed conveyor means 12 rests against an arresting and releasing member 15 which is provided with a roller or rollers 14. The member 15 can be raised and lowered in a manner which will be more fully described in connection with FIG. 3. Since the trailing edge of braking component 4 terminates at a distance from the arresting and releasing member 15, the lower surface of the board 3c will come into contact with the upper surface of the intermediate conveyor means 6 when the conveyor means 1 is lowered to the position disclosed in FIG. 2.

The intermediate conveyor means 6 preferably includes a plurality of endless belts trained over a plurality of pulleys 7, 8 and 9 at a speed determined by the distance between the pulleys 7 and 9, the speed of the higher speed conveyor means 12 and the distance between the lugs provided on the conveyor means 12. The conveyor 6 is arranged to move the boards one at a time, in the present embodiment the board 3c onto a position on the conveyor means 12 between two lugs such as lugs 13 and 13 . While only the receiving end of the conveyor means 12 is illustrated, it will be appreciated that the conveyor continues to the right-hand side of the drawing where it may terminate at any desired location.

The high-speed conveyor means 12 at the receiving end thereof passes about a sprocket wheel 10 journaled on a shaft 11. The conveyor means 12 is of the endless type and is provided with driving means known per se.

The intermediate conveyor means 6 may be driven by separate driving means or by a gearbox interposed between the shaft 11 and one of the shafts for the pulleys 7, 8 or 9. However, according to the invention, the transport speed of the intermediate conveyor means 6 shall bear a definite relationship to the transport speed of the conveyor means 12 such that the ratio of the speed of the conveyor means 6 to the distance between the receiving end of the conveyor means 6 and the delivery end thereof, in the present embodiment substantially equal to the distance between the pulleys 7 and 9, shall be equal to or greater than the transport speed of the conveyor means 12 and the distance between two lugs on the conveyor means 12 namely the distance between the lugs 13 and 13' or 13' and 13''. This is based on the provision that the rocking movement of the conveyor means 1 is properly synchronized with the arrival of the lugs 13 a predetermined point of the receiving end of the conveyor means 12 and the above-mentioned speeds assure a board always being delivered onto the conveyor means 12 between two lugs preferably close to the trailing lug of a pair of adjacent lugs.

With reference to FIG. 3 there is illustrated a synchronizing arrangement which assures the proper operation of the present feed-rate-equalizer means. In order that the conveyor assemblage can be capable of operation at high speeds, such as for example a rate of 80 boards per minute, an excellent synchronization is required between the rocking movement of the conveyor means 1 and the lug positions on the high-speed conveyor means 12. In a typical application, the conveyor assemblage may be employed at the rate of 80 boards per minute for moving boards having a thickness of 2 inches and a varying width, for example up to a maximum of 12 inches. The average speed at which the boards arrive at the conveyor means 1 may be assumed to be 34 inches per second and the transport speed of the conveyor means 6 96 inches per second with the speed of the conveyor means 12 being somewhat in excess of 32 inches per second and the distance between successive or adjacent lugs 23–24 inches.

A complete raising and lowering operation of the conveyor means 1 must therefore take place in 750 ms. or less and the operation may, for example, cause the conveyor means 1 to rest in its upper position during 350 ms., downward travel for 125 ms., remain in the lower position or 150 ms. and the return to the initial upper position in 125 ms.

With reference to FIG. 3 it will be noted that the shaft 11 of the sprocket wheel 10 is provided with a cam 16 preferably attached to the shaft such that its angular position with respect to the lugs 13 can be adjusted. It is, of course, not necessary that the cam actually be secured to the shaft 11 and for many applications, it may be advisable to provide a gearbox between the shaft 11 and the shaft of the cam 16. A roller 17 journaled on a shaft provided for an arm 18 functions as a cam follower. The arm 18 may rotate about a shaft 19 and one end of the arm 18 is connected by a link 26 to the lower end of the conveyor means 1 at the location at which the arresting and releasing member 15 is arranged. As previously described, the inclined conveyor means 1 may rotate about the shaft 5 as illustrated in FIGS. 1 and 2. At the opposite end of the arm 18 located on the same side of the shaft 19 as the roller 17 but outside thereof is attached an armature plate 20. The armature plate may be held in the position disclosed in FIG. 3 by means of the core of an electromagnet 21 and when locked in this fashion, the lower end of the conveyor means 1 will be in its elevated position independently of the angular position of the cam 16.

In normal operation the assemblage operates as follows:

The cam 16 rotates in synchronism with the shaft 11 in the illustrated embodiment, but it is to be understood, that the actual synchronization is that between the lugs 13 and the cam 16. The cam follower roller 17 follows or tracks the periphery of the cam 16 provided the electromagnet 21 is not energized. The roller 17 is pressed against the periphery of the cam 16 by a force mainly emanating from the weight of the conveyor means 1 acting via the link 26 connected to one end of the arm 18. The movement of the roller 17 will thus be transmitted to the lower end of the inclined conveyor means 1 so that such end will be raised and lowered in synchronization with the rotation of the cam 16 thereby providing the movements illustrated in FIGS. 1 and 2.

Each time the conveyor means 1 is lowered, one board will come into frictional contact or engagement with the upper surface of the intermediate conveyor means 6 and be transported towards the high-speed conveyor means 12. In the meanwhile, the board pieces located immediately after the board being transported will be retained by the frictional braking component 4 until the conveyor means 1 is again raised at which time the boards will roll forward on the rollers and this movement takes place by virtue of the influence of gravity.

Thus far, the normal operation of the assemblage has been described, namely the operation when a number of boards are present on the conveyor means 1. It is to be understood that if only one board was present and another board arrived during the period at which the conveyor means 1 is lowered, this might cause the arriving board also, due to its inertia, to slide over the braking component during the period when the first-mentioned board is being transported or moved by the intermediate conveyor means 6. For this reason, a light source 24 and a photocell 25 may preferably be arranged at a predetermined distance from the member 15 of the conveyor means 1 in the path of the arriving boards.

The output signal from the photocell 25 is connected to the input of an amplifier 27 having a sufficient time constant for producing an output signal also when a board is temporarily blocking or cutting off the light beam between the light source 24 and the photocell 25. The output signal from the amplifier 27 is fed to an inverting end gate 28 and the other input of which is fed a signal from a sensing element 23 arranged for producing an output signal at those angular positions of the cam 16 corresponding to segments 22a and 22b. If the signals from the sensing element 23 were directly fed to the electromagnet 21, the electromagnet would be energized and the arm 18 arrested for these angular positions at which the cam follower 17 otherwise would permit the conveyor means 1 to be lowered. The output from the gate 28 is fed to an amplifier 29 which supplies the energizing current to the coil of the electromagnet 21.

Hence, the electromagnet 21 will remained energized at all times when the roller 17 otherwise would permit the conveyor means 1 to be lowered as long as an output signal is obtained from the photocell 25 denoting that an insufficient number of boards are present on the roller table. When the layer of boards, however, has reached a certain length which is selected such that it will present a sufficient mass to absorb the shock from additionally arriving boards, the electronic interlocking means described will release the synchronizing mechanism illustrated in FIG. 3 to enable the conveyor assemblage to start to operate in the manner described in connection with FIGS. 1 and 2.

It will be seen that the objects of the invention are fully realized inasmuch as there are provided reliable means for a feed-rate equalization in a conveyor assemblage of the type described. This has been achieved by providing the conveyor assemblage with selectively releasable arresting means interpositioned between the inclined conveyor means and the intermediate conveyor means, synchronizing the operation of such means with the high-speed conveying means and selecting a certain speed for the intermediate conveyor means which is a function of the length of the intermediate conveyor means, the speed of the high-speed conveyor means and the distance between adjacent lugs on the high-speed conveyor means.

By virtue of the present invention the desired ends can be achieved without the complex and expensive mechanisms previously employed in similar arrangements, which mechanisms regardless of their reliability at low speeds were unreliable at high speeds due to their mass and moment of inertia and also demonstrate excessive wear.

The invention is not to be confined to any strict conformity to the showings in the drawings but changes or modifications may be made therein so long as such changes or modifications mark no material departure from the spirit and scope of the appended claims.

What is claimed is:

1. In a conveyor assemblage having a receiving end and a delivering end for wooden boards and similar elongated wooden articles in which the boards arrive at the receiving end in a random time sequence at an average maximum rate and leave at the delivering end in an orderly sequence having a fixed, predetermined rate substantially equal to the average rate and feed-rate-equalizing means therefore, said assemblage including a first inclined gravity-operated transport means having an upper receiving end constituting the receiving end of the assemblage and a lower delivering end, a first conveyor means having a receiving end, transporting means, a delivering end and driving means, a second conveyor means having a receiving end, transporting means moving a predetermined speed, a plurality of lugs uniformly positioned along the transporting means and driving means, said feed-rate-equalizing means comprising selectively releasable arresting means located between the lower delivering end of said first inclined gravity-operated transport means and the receiving end of the first conveyor means, means operably connecting the arresting means to the driving means of the second conveyor means for allowing one board to move between the delivering end of the transport means and the receiving end of the first conveyor means at a predetermined time determined by the position of any one of the lugs of the transporting means of the second conveyor means relative to the receiving end of the second conveyor means, and the ratio of the speed of the transporting means of the first conveyor means to the distance between the receiving end and the delivering end of the first conveyor means being equal to or greater than the ratio of the speed of the transporting means of the second conveyor means to the distance between two subsequent lugs of the transporting means of the second conveyor means; a roller table located at the lower end of said inclined transport means, stationary braking means positioned between the rollers of the table, and means operably connected to the driving means of the second conveyor means for imparting a periodic relative movement between the lower end of the inclined transport means and the braking means.